(12) United States Patent
Kikuchi

(10) Patent No.: US 11,966,508 B2
(45) Date of Patent: Apr. 23, 2024

(54) SURVEY SYSTEM

(71) Applicant: TOPCON CORPORATION, Tokyo (JP)

(72) Inventor: Takeshi Kikuchi, Tokyo (JP)

(73) Assignee: TOPCON CORPORATION, Toyota (JP)

( * ) Notice: Subject to any disclaimer, the term of this patent is extended or adjusted under 35 U.S.C. 154(b) by 0 days.

(21) Appl. No.: 17/940,595

(22) Filed: Sep. 8, 2022

(65) Prior Publication Data

US 2023/0098762 A1   Mar. 30, 2023

(30) Foreign Application Priority Data

Sep. 24, 2021 (JP) .................. 2021-155917

(51) Int. Cl.
| | | |
|---|---|---|
| *G06F 3/01* | (2006.01) | |
| *G01C 15/00* | (2006.01) | |
| *G01C 15/06* | (2006.01) | |
| *G02B 27/01* | (2006.01) | |

(52) U.S. Cl.
CPC ........... *G06F 3/013* (2013.01); *G01C 15/002* (2013.01); *G01C 15/06* (2013.01); *G02B 27/0101* (2013.01); *G06F 3/012* (2013.01); *G02B 2027/0141* (2013.01)

(58) Field of Classification Search
CPC ....... G06F 3/013; G06F 3/012; G01C 15/002; G01C 15/06; G01C 1/02; G01C 3/00; G02B 27/0101; G02B 2027/0141; G01S 17/66

See application file for complete search history.

(56) References Cited

U.S. PATENT DOCUMENTS

| | | | | |
|---|---|---|---|---|
| 6,094,625 A | * | 7/2000 | Ralston | .................. G01C 15/00 239/161 |
| 11,221,217 B1 | * | 1/2022 | Kahle | ..................... G01S 17/42 |
| 2003/0014212 A1 | | 1/2003 | Ralston et al. | |

(Continued)

FOREIGN PATENT DOCUMENTS

| | | |
|---|---|---|
| EP | 3140710 | 3/2017 |
| JP | 2009-229350 A | 10/2009 |
| WO | 2020119912 | 6/2020 |

OTHER PUBLICATIONS

Related U.S. Appl. No. 17/940,558, filed Sep. 8, 2022.
Related U.S. Appl. No. 17/940,578, filed Sep. 8, 2022.

*Primary Examiner* — Mihir K Rayan
(74) *Attorney, Agent, or Firm* — Studebaker & Brackett PC

(57) ABSTRACT

A survey system is provided which includes a surveying instrument capable of making distance and angle measurements of a target attached to apole, and an eyewear device including an eye sensor configured to detect an eye motion, and an input unit for inputting a command corresponding to an eye motion detected by the eye sensor into the surveying instrument, and capable of displaying an image superimposed on a landscape. Measurement points are displayed on the eyewear device by being synchronized with and superimposed on a landscape of a survey site, and from the eyewear device worn by a worker, according to an eye motion, a command is input into the surveying instrument and distance and angle measurements of the target are made. A worker can perform a work while keeping a posture gripping the pole.

6 Claims, 12 Drawing Sheets

(56) References Cited

U.S. PATENT DOCUMENTS

| | | | |
|---|---|---|---|
| 2009/0244277 A1* | 10/2009 | Nagashima | G01C 15/002 345/173 |
| 2011/0001695 A1* | 1/2011 | Suzuki | G06F 3/012 345/7 |
| 2014/0049452 A1* | 2/2014 | Maltz | G02B 27/017 345/8 |
| 2017/0337743 A1* | 11/2017 | Metzler | G01C 1/04 |
| 2019/0094021 A1* | 3/2019 | Singer | G01C 15/008 |
| 2021/0080255 A1* | 3/2021 | Kikuchi | G01C 15/002 |
| 2021/0404808 A1* | 12/2021 | Yasutomi | G01C 15/002 |
| 2022/0283327 A1 | 9/2022 | Mueller et al. | |

* cited by examiner

SURVEY SYSTEM

TECHNICAL FIELD

The present invention relates to a survey system that improves the work efficiency of a survey that is taken by a worker alone.

BACKGROUND ART

In recent years, there is an increasing number of cases where a worker takes a survey alone (one-man survey) (for example, Patent Literature 1). A worker can take a survey alone by carrying a device including a display unit and an input unit with him/her, moving to a measurement point while holding a pole with a target, confirming the measurement point with the display unit of the device, and remotely instructing a surveying instrument to make distance and angle measurements by the input unit.

CITATION LIST

Patent Literature

Patent Literature 1: Japanese Published Unexamined Patent Application No. 2009-229350

SUMMARY OF INVENTION

Technical Problem

However, this case has a problem in which a worker has to move while confirming the display unit of the device, and input a measurement command by the input unit to make measurements, so that a series of operations take time.

The present invention was made to solve this problem, and provides a survey system that improves the work efficiency of a survey that is taken by a worker alone.

Solution to Problem

In order to solve the problem described above, according to an aspect of the present disclosure, a survey system is provided which includes a target, a pole to which the target is attached, a surveying instrument including a distance-measuring unit configured to measure a distance to the target, an angle-measuring unit configured to measure a vertical angle and a horizontal angle at which the distance-measuring unit faces, a driving unit configured to drive a vertical angle and a horizontal angle of the distance-measuring unit to set angles, a communication unit, and an arithmetic control unit configured to execute input commands, and capable of making distance and angle measurements of the target, an eyewear device including an eye sensor configured to detect an eye motion of a wearer, an input unit for inputting various commands, a communication unit, a display, a relative position detection sensor configured to detect a position of the device, and a relative direction detection sensor configured to detect a direction of the device, a storage unit configured to store a measurement point at a survey site, and an arithmetic processing unit including a synchronous-measuring unit configured to receive information on a position and a direction of the eyewear device and synchronize the information with coordinates of the measurement point, wherein on the display, the measurement point calculated by the arithmetic processing unit is displayed so as to be superimposed on a landscape of the survey site, a command corresponding to an eye motion detected by the eye sensor is input by the input unit, and distance and angle measurements by the surveying instrument are made according to a command from the input unit.

According to this aspect, with the eyewear device, a worker can confirm a measurement point superimposed on a landscape of a survey site, and further, can send a command to the surveying instrument by an eye motion while keeping a posture in which the worker grips the pole. A worker can perform actions necessary for a survey without wasted motion, and the work efficiency of a survey by a worker alone is improved.

According to an aspect, the eye sensor is a line-of-sight sensor configured to detect a line-of-sight of a wearer, and on the display, a line-of-sight marker based on the line-of-sight sensor is displayed, and various commands are displayed on the display in the form of images by the input unit, and an image selected by the line-of-sight marker is input as a command According to this aspect, by using the line-of-sight marker, a worker can input a command while viewing the display.

According to an aspect, the eye sensor includes an imaging device configured to detect an eye motion, and a determining unit configured to determine matching between an eye motion detected by the imaging device and a plurality of motions registered in advance, and the input unit inputs a command corresponding to a motion determined to be matching by the determining unit. A worker can input a command just by an eye motion, and can input a command without turning his/her gaze and changing his/her posture.

According to an aspect, the surveying instrument includes a tracking unit configured to automatically track the target, and is configured so that the target is automatically tracked when the target is within a predetermined range from the measurement point, and position information of the target is displayed in real time on the display. According to this aspect, in a state where the target is locked on to, detailed position information is added, so that the pole can be installed at a measurement position with higher accuracy in a short time.

According to an aspect, the storage unit and the arithmetic processing unit are included in the surveying instrument. By including these units software-wise or hardware-wise in the surveying instrument, components can be reduced. Settings can be made with the surveying instrument, so that the entire configuration can be simplified.

Advantageous Effects of Invention

As is clear from the above description, according to the present invention, a survey system that improves the work efficiency of a survey by a worker alone can be provided.

DESCRIPTION OF EMBODIMENTS

Hereinafter, a detailed embodiment of a configuration of the present disclosure will be described with reference to the drawings. The embodiment is not intended to limit the invention but just an example, and all features described in the embodiment and combinations thereof are not always essential to the invention. Components having the same configuration are provided with the same reference signs, and overlapping description thereof will be omitted.

Embodiment

Figure 1:
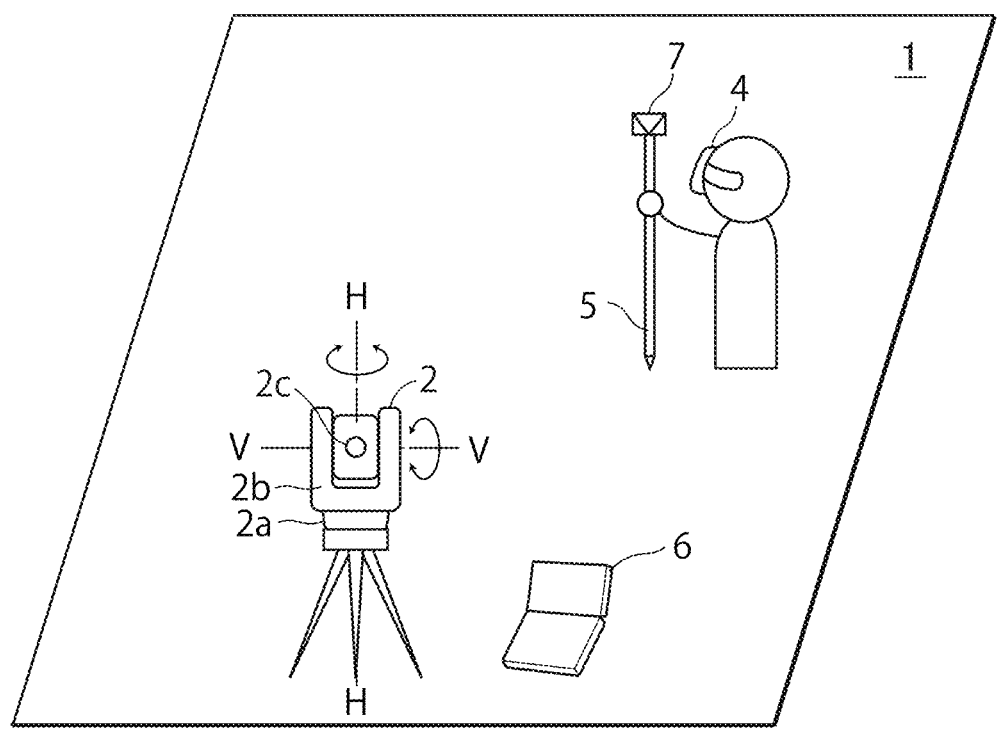
FIG. 1 is a schematic configuration view of a survey system according to a first embodiment.

FIG. 1 is an external perspective view of a survey system 1 according to a preferred embodiment of the present invention, and illustrates a work image at a survey site. The survey system 1 according to the present embodiment includes a pole 5 to which a target 7 is attached, a surveying instrument 2, a processing PC 6, and an eyewear device 4.

The surveying instrument 2 is installed on a reference point center by using a tripod. The surveying instrument 2 includes a base portion 2a provided on a leveling device, a bracket portion 2b that rotates on the base portion 2a horizontally around an axis H-H, and a telescope 2c that rotates vertically around an axis V-V at a center of the bracket portion 2b.

The eyewear device 4 is worn on the head of a worker. The processing PC 6 is installed at a survey site.

The pole 5 is used in a state where its lower end is installed substantially vertically on a measurement point. The target 7 is a surveying target of the surveying instrument 2, and has optical characteristics that retro-reflects light incident from all directions. The target is attached so that an optical center (optical reflection point) of the target 7 is set on a central axis of the pole 5, and an attaching height (distance from the lower end of the pole 5 to the optical center) is known.

Figure 2:
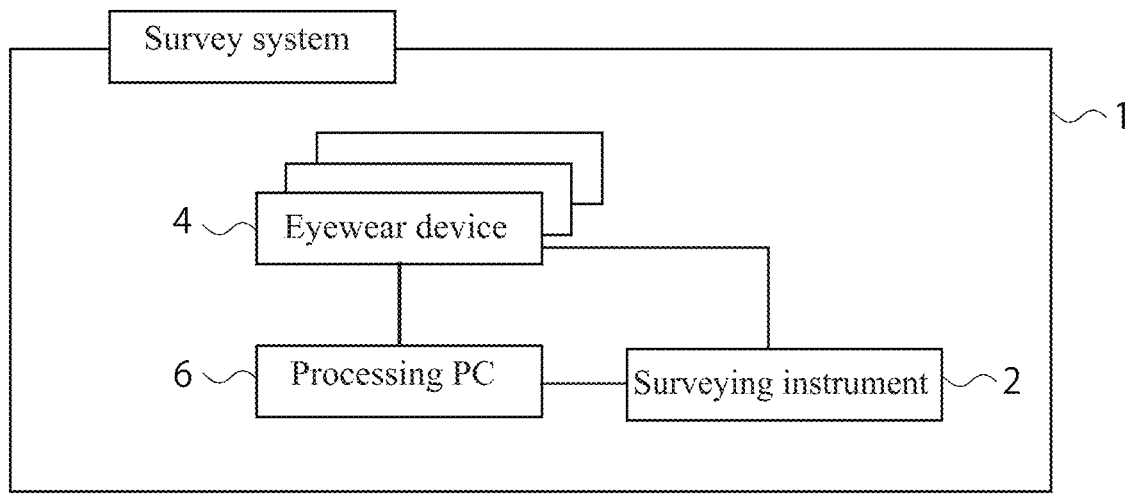
FIG. 2 is a configuration block diagram of the same survey system.

FIG. 2 is a configuration block diagram of the survey system 1. In the survey system 1, the eyewear device 4, the surveying instrument 2, and the processing PC 6 are wirelessly connected to each other (may be connected by wire). The eyewear device 4 has a remote operation function for the surveying instrument 2, and is configured to transmit a command wirelessly to the surveying instrument 2 from a remote location. In the present embodiment, the number of workers is assumed to be one, however, the number of eyewear devices 4 is not particularly limited, and may be one or plural in number. When a plurality of eyewear devices 4 are used, the respective eyewear devices 4 are configured to be distinguishable by their unique IDs, etc.

(Surveying Instrument 2)

Figure 3:
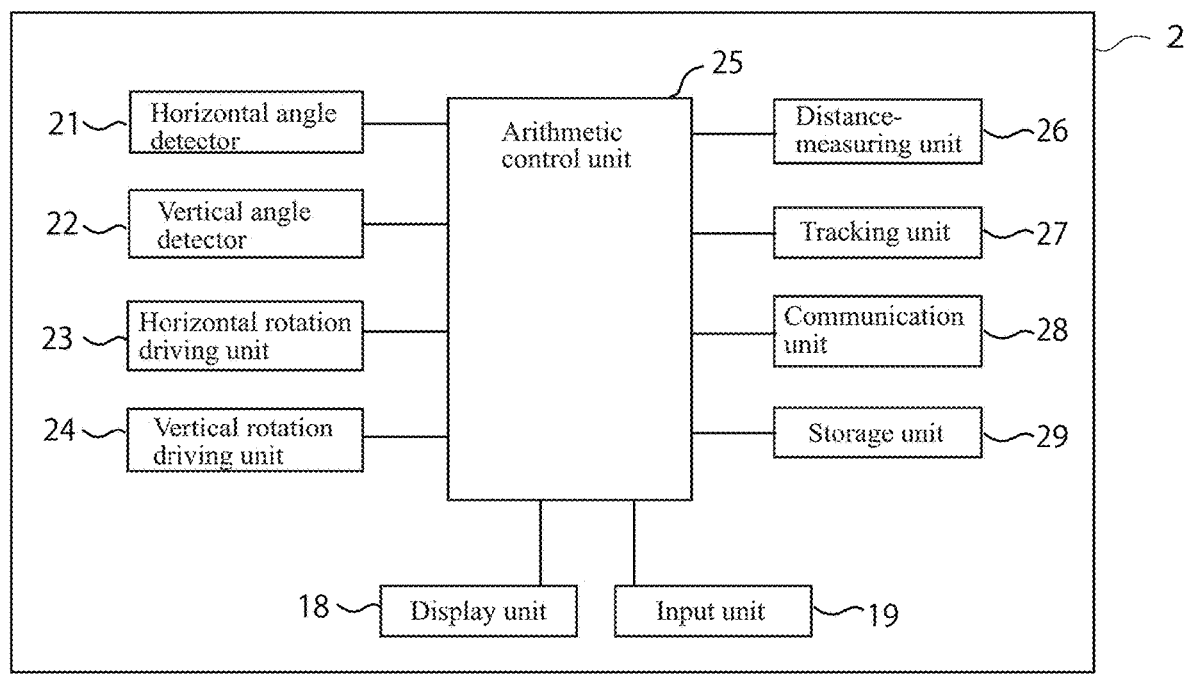
FIG. 3 is a configuration block diagram of a surveying instrument related to the same survey system.

FIG. 3 is a configuration block diagram of the surveying instrument 2. The surveying instrument 2 is a motor-driven total station, and includes a horizontal angle detector 21, a vertical angle detector 22, a horizontal rotation driving unit 23, a vertical rotation driving unit 24, an arithmetic control unit 25, a distance-measuring unit 26, a tracking unit 27, a communication unit 28, a storage unit 29, a display unit 18, and an input unit 19.

The horizontal angle detector 21 and the vertical angle detector 22 are encoders. The horizontal angle detector 21 is provided on a rotation shaft of the bracket portion 2b, and detects a horizontal angle of the bracket portion 2b. The vertical angle detector 22 is provided on a rotation shaft of the telescope 2c, and detects a vertical angle of the telescope 2c.

The horizontal rotation driving unit 23 and the vertical rotation driving unit 24 are motors. The horizontal rotation driving unit 23 drives the rotation shaft of the bracket portion 2b, and the vertical rotation driving unit 24 drives the rotation shaft of the telescope 2c. By collaboration of both driving units, the orientation of the telescope 2c is changed. The horizontal angle detector 21 and the vertical angle detector 22 constitute an angle-measuring unit. The horizontal rotation driving unit 23 and the vertical rotation driving unit 24 constitute a driving unit.

The distance-measuring unit 26 includes a light transmitting unit and a light receiving unit, and outputs distance-measuring light, for example, infrared pulsed laser, etc., from the light transmitting unit, receives reflected light of the distance-measuring light by the light receiving unit, and measures a distance from a phase difference between the distance-measuring light and internal reference light. The distance-measuring unit can make not only a prism measurement but also a non-prism measurement.

The tracking unit 27 includes a tracking light transmitting system that outputs, as tracking light, infrared laser, etc., of a wavelength different from that of the distance-measuring light, and a tracking light receiving system including an image sensor such as a CCD sensor or CMOS sensor. The tracking unit 27 acquires a landscape image including the tracking light and a landscape image excluding the tracking light, and transmits both images to the arithmetic control unit 25. The arithmetic control unit 25 obtains a center of a target image from a difference between the images, detects a position where a deviation between a center of the target image and a visual axis center of the telescope 2c falls within a certain value as a position of the target, and performs automatic tracking to cause the telescope 2c to always face the target.

The communication unit 28 enables communication with an external network, and for example, connects to the Internet by using an internet protocol (TCP/IP) and transmits and receives information to and from the processing PC 6 and the eyewear device 4. The wireless communication is not limited to this, and known wireless communication can be used. Measurement results (distance and angle measurements) made by the surveying instrument 2 are transmitted to the processing PC 6 through the communication unit 28.

The arithmetic control unit 25 is a microcontroller including a CPU, and performs, as controls, information transmission and reception through the communication unit 28, driving of the respective rotation shafts by the horizontal rotation driving unit 23 and the vertical rotation driving unit 24, a distance measurement by the distance-measuring unit 26, angle measurements by the horizontal angle detector 21 and the vertical angle detector 22, and automatic tracking by the tracking unit 27.

The storage unit 29 includes a ROM and a RAM. In the ROM, programs for the arithmetic control unit 25 are stored, and the respective controls are performed in the RAM.

The display unit 18 and the input unit 19 are interfaces of the surveying instrument 2. The input unit includes a power key, numeric keys, and an execution key, etc., and with the input unit, a worker can operate the surveying instrument 2 and input information into the surveying instrument 2. In the present embodiment, commands of a surveying work and result confirmation can also be performed with the processing PC 6 through the communication unit 28. In addition, commands for the surveying instrument 2 can also be issued from the eyewear device 4.

(Eyewear Device 4)

Figure 4:
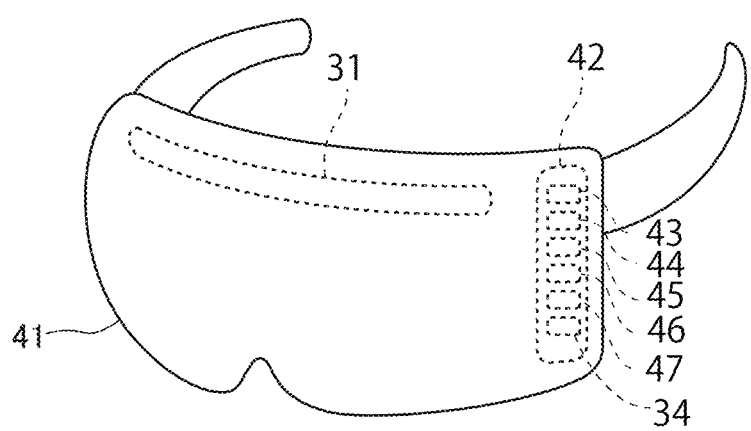
FIG. 4 is an external perspective view of an eyewear device.
Figure 5:
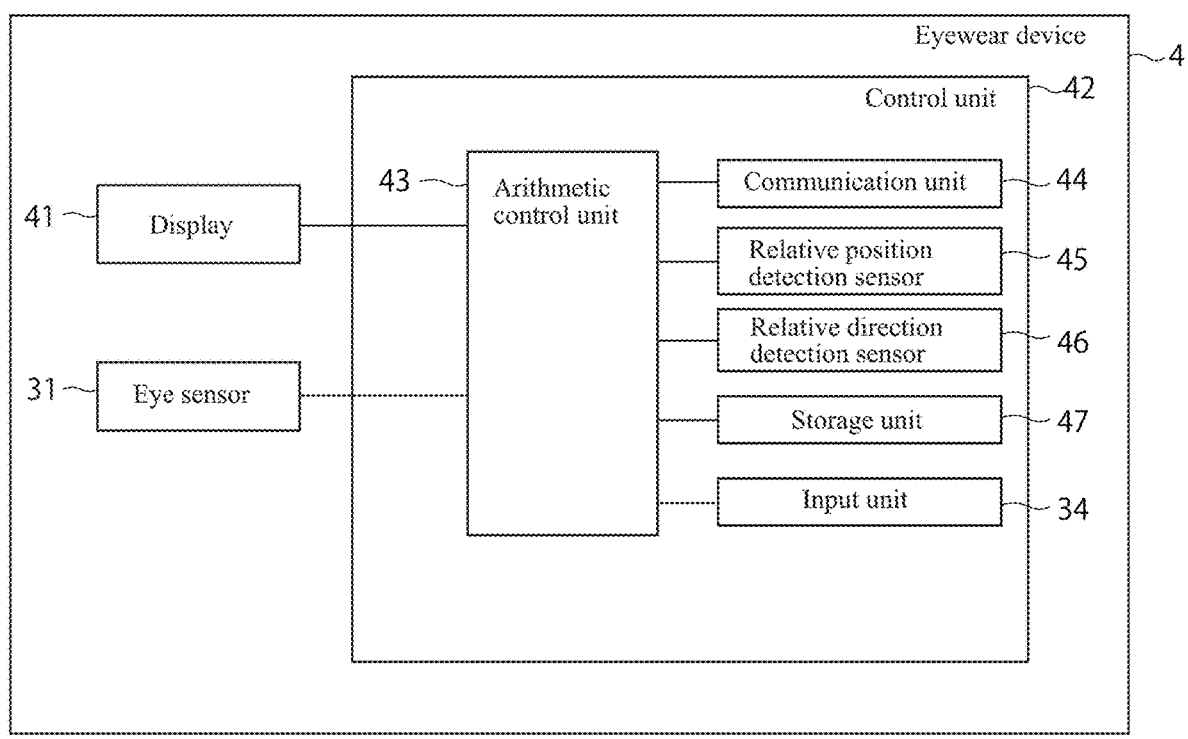
FIG. 5 is a configuration block diagram of the same eyewear device.

FIG. 4 is an external perspective view of the eyewear device 4. FIG. 5 is a configuration block diagram of the eyewear device 4.

The eyewear device 4 is a wearable device to be worn on the head of a worker, and includes a display 41, a control unit 42, an arithmetic control unit 43, a communication unit 44, a relative position detection sensor 45, a relative direction detection sensor 46, a storage unit 47, an eye sensor 31, and an input unit 34.

The display 41 is a goggles-lens-shaped transmissive display that covers the eyes of a worker when the worker wears it. As an example, the display 41 is an optical see-through display using a half mirror, and is configured to enable observation of a virtual image projected by the control unit 42 in a state where the virtual image is superimposed on a real image of a landscape of the site (hereinafter, referred to as "actual landscape").

The communication unit 44 has a configuration equivalent to the configuration of the communication unit described above, and transmits and receives information to and from the surveying instrument 2 and the processing PC 6.

The relative position detection sensor 45 performs wireless positioning from a GPS antenna, a Wi-Fi (registered trademark) access point, and an ultrasonic oscillator, etc., installed at the survey site, to detect a position of the eyewear device 4 at the survey site.

The relative direction detection sensor 46 consists of a combination of a triaxial accelerometer or a gyro sensor and a tilt sensor. The relative direction detection sensor 46 detects a tilt of the eyewear device 4 by setting the up-down direction as a Z axis, the left-right direction as a Y axis, and the front-rear direction as an X axis.

The storage unit 47 is, for example, a memory card. The storage unit 47 stores programs for the arithmetic control unit 43 of the eyewear device 4 to execute functions.

The eye sensor 31 is a line-of-sight sensor that detects a line-of-sight of a wearer, and is provided on a rear side (wearer's face side) of the display 41. The eye sensor 31 includes an imaging device such as a CCD or CMOS and an image processing device, detects a line-of-sight of a wearer based on position relationships between inner corner positions and iris positions of the eyes, and detects position coordinates of the line-of-sight of the wearer on the display 41. On the display 41, at a location corresponding to the position coordinates of the line-of-sight detected by the eye sensor 31, a line-of-sight marker EM is displayed.

The input unit 34 is configured software-wise, and contents of commands such as "Survey" and "Re-track" are displayed as images (virtual images) of icons, character strings, etc., on the display 41. The input unit 34 is used in combination with the eye sensor 31, and when a worker aligns the line-of-sight marker EM with a displayed image for a predetermined period of time or longer, a command is executed. A predetermined motion of the line-of-sight may be used as an operation to determine a command. For example, a configuration may be made in which a command selected by the line-of-sight marker EM is executed by "blinking" slowly twice during which the line-of-sight disappears.

The control unit 42 is a microcomputer configured by mounting at least a CPU and a memory (RAM, ROM) on an integrated circuit. The arithmetic control unit 43 outputs information on a position and a direction of the eyewear device 4 detected by the relative position detection sensor 45 and the relative direction detection sensor 46 to the processing PC 6 through the communication unit 44. The arithmetic control unit 43 receives position data of the measurement points Y from the processing PC 6 and superimposes and displays the position data on the landscape of the site on the display 41. In addition, from position coordinates of the line-of-sight detected by the eye sensor 31, a line-of-sight marker EM is displayed on the display 41 in accordance with the line-of-sight of the worker, commands are displayed as images according to the situation, and processing of a determined command is executed.

(Processing PC 6)

Figure 6:
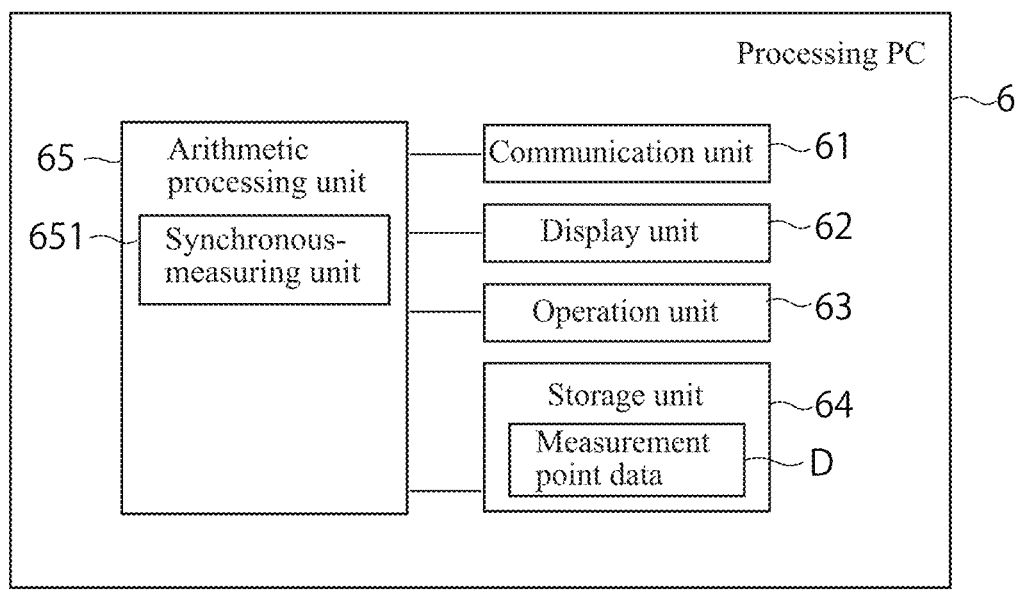
FIG. 6 is a configuration block diagram of a processing PC.

FIG. 6 is a configuration block diagram of the processing PC 6. The processing PC 6 is a general-purpose personal computer, a dedicated hardware using a PLD (Programmable Logic Device), etc., a tablet terminal, or a smartphone, etc. The processing PC 6 includes a communication unit 61, a display unit 62, an operation unit 63, a storage unit 64, and an arithmetic processing unit 65.

The communication unit 61 has a structure equivalent to the structure of the communication unit described above, and transmits and receives information to and from the surveying instrument 2 and the eyewear device 4.

The display unit 62 is, for example, a liquid crystal display. The operation unit 63 is a keyboard, a mouse, etc., and enables various inputs, selections, and determinations.

The storage unit 64 is, for example, an HDD drive. The storage unit 64 stores information on a survey site, including at least measurement point data D as coordinate data of measurement points Y (Y1, Y2, Y3 . . . ) to be measured at the survey site.

The arithmetic processing unit 65 is a control unit configured by mounting at least a CPU and a memory (RAM, ROM, etc.) on an integrated circuit. In the arithmetic processing unit 65, a synchronous-measuring unit 651 is configured software-wise.

The synchronous-measuring unit 651 receives information on a position and a direction of the surveying instrument 2 and information on a position and a direction of the eyewear device 4, and converts the information so that a coordinate space of the surveying instrument 2, a coordinate space of the measurement point data D, and a coordinate space of the eyewear device 4 match each other, and transmits the information to the eyewear device 4.

Hereinafter, an operation to match coordinate spaces of information on positions and directions in devices or data having different coordinate spaces, and manage relative positions and relative directions related to the respective devices in a space with an origin set at a common reference point, is referred to as synchronization.

(Measuring Method)

Figure 7:
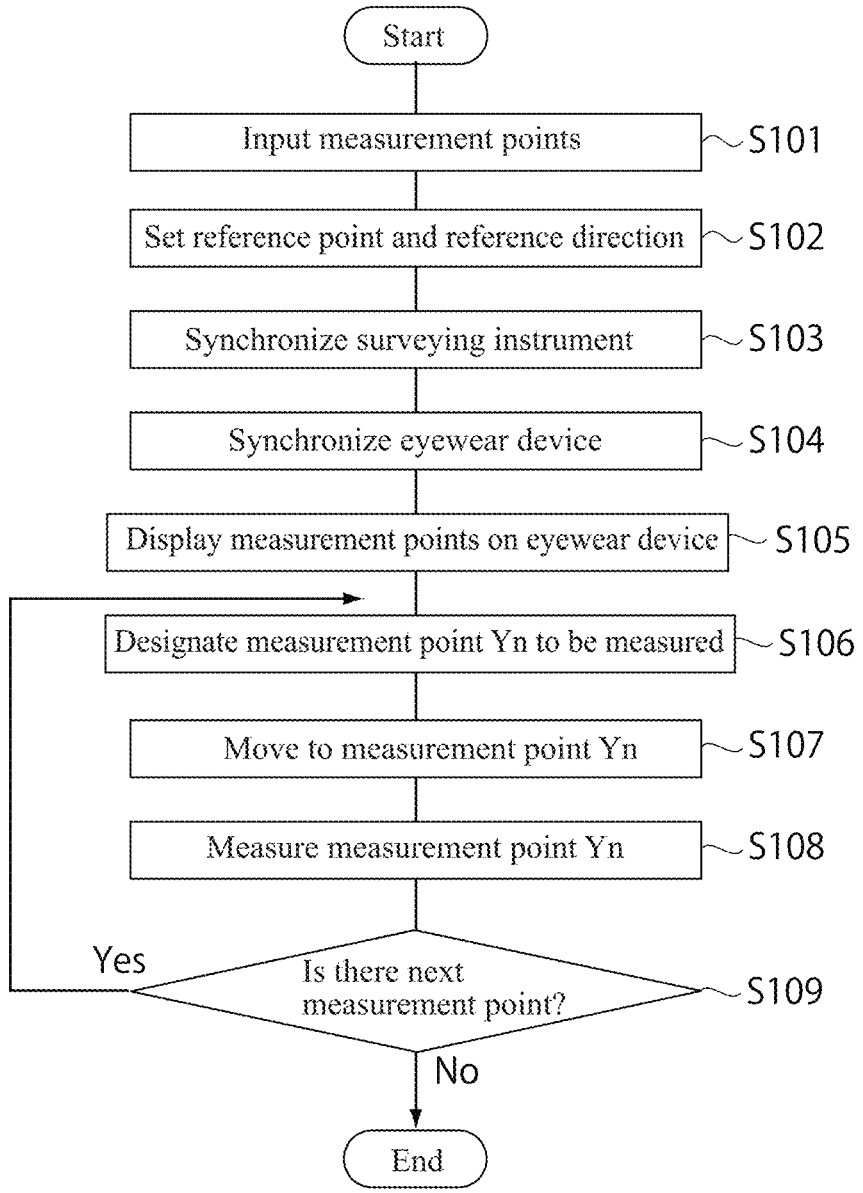
FIG. 7 is a process flowchart of the survey system.
Figure 8:
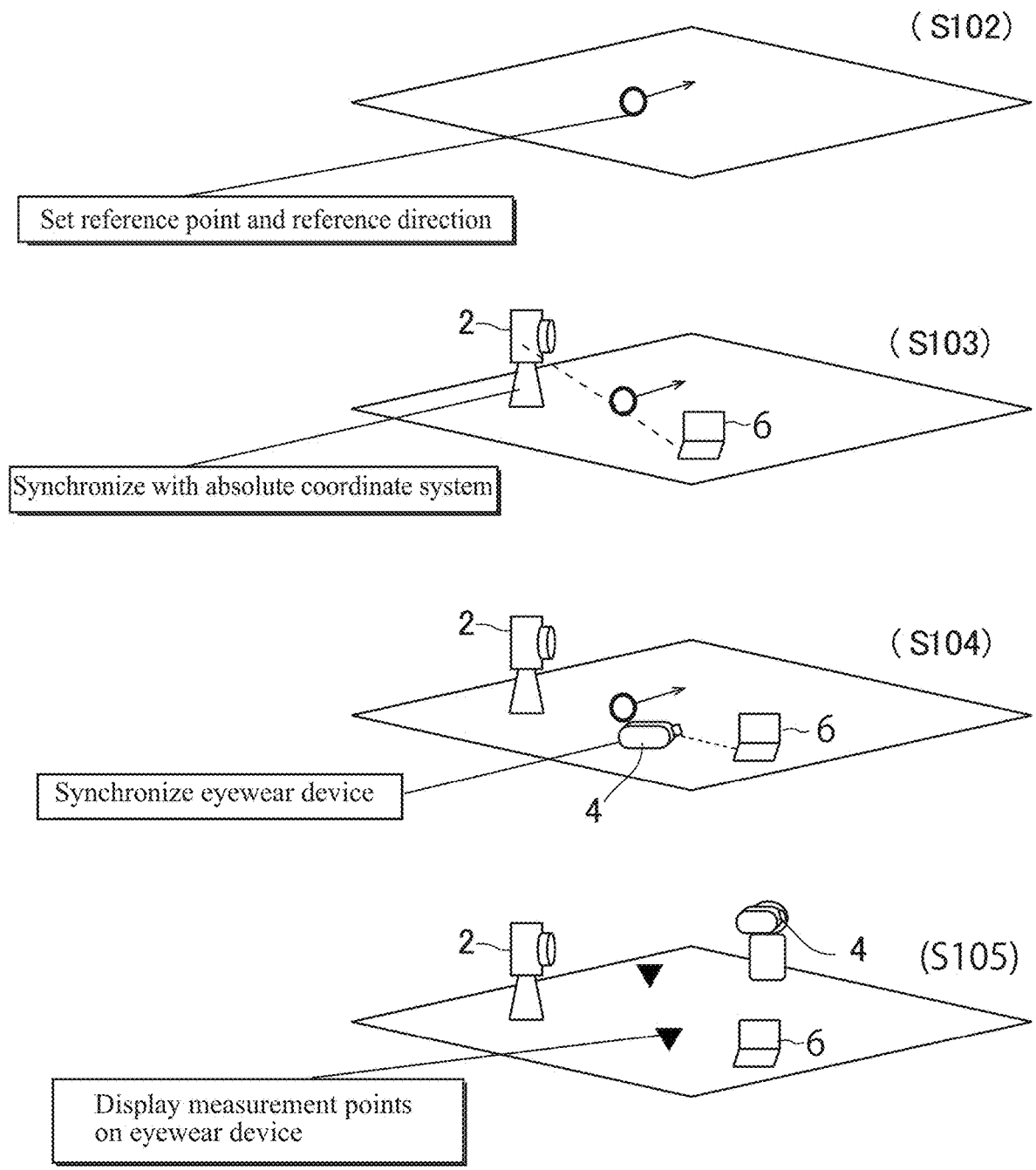
FIG. 8 is a drawing describing initial settings (steps S102 to S105) in the same process flow.

Next, an example of use of the survey system 1 (staking work) will be described. FIG. 7 illustrates a process flow of the work using the survey system 1. FIG. 8 is a work image view of Steps S102 to S105. FIG. 9 and FIGS. 10A, 10B, and 10C illustrate examples of images viewed from the eyewear device 4 according to the survey system 1.

First, in Step S101, as pre-processing, a worker inputs information on a survey site including CAD data and measurement point data D for staking into the processing PC 6. The input information is stored in the storage unit 64 of the processing PC 6.

Next, the processing shifts to Step S102, and the worker sets a reference point and a reference direction at the survey site. As the reference point, an arbitrary point within the site such as prescribed coordinates is selected. As the reference direction, a direction from a reference point to a characteristic point is set after arbitrarily selecting the characteristic point different from the reference point.

Next, the processing shifts to Step S103, and the worker synchronizes the surveying instrument 2. Specifically, the worker installs the surveying instrument 2 at the reference point at the site, and grasps absolute coordinates of the surveying instrument 2 by observation of backward intersection, etc., including the reference point and the characteristic point. The surveying instrument 2 transmits the coordinate information to the processing PC 6. The synchronous-measuring unit 651 of the processing PC 6 converts absolute coordinates of the reference point into (x, y, z)=(0, 0, 0), and recognizes the reference direction as a horizontal angle of 0 degrees, and thereafter, concerning information from the surveying instrument 2, manages a relative position and a relative direction of the surveying instrument 2 in a space with an origin set at the reference point.

Next, the processing shifts to Step S104, and the worker synchronizes the eyewear device 4. Specifically, the worker installs the eyewear device 4 at the reference point, matches a center of the display 41 with the reference direction, and sets (x, y, z) of the relative position detection sensor 45 to (0, 0, 0) and sets (roll, pitch, yaw) of the relative direction detection sensor 46 to (0, 0, 0). Thereafter, concerning data acquired from the eyewear device 4, the synchronous-measuring unit 651 of the processing PC 6 manages a relative position and a relative direction of the eyewear device 4 in the space with an origin set at the reference point. As a result, a relative position and a relative direction of the eyewear device 4 are also managed in the space with an origin set at the reference point.

Synchronization of the eyewear device 4 is not limited to the method described above, and may be performed, for example, in such a manner that the eyewear device 4 is provided with a laser device for indicating a center and a directional axis of the eyewear device 4, and by using a laser as a guide, the center and the directional axis are matched with the reference point and the reference direction.

Alternatively, it is also possible that a storing position for the eyewear device 4 is provided in the surveying instrument 2, and a relative relationship between the eyewear device 4 and the surveying instrument 2 is determined in advance, and by starting synchronization in a state where the eyewear device 4 is stored in the storing position of the surveying instrument 2, they are synchronized based on the relative relationship.

Next, the processing shifts to Step S105, and the synchronized measurement point data D is displayed on the display 41 of the eyewear device 4. When the worker wears the eyewear device 4 and views the inside of the survey site, a relative position and a relative direction of the eyewear device 4 to the actual landscape are managed by the processing PC 6, so that from the processing PC 6, the measurement point data D synchronized with the actual landscape (real image of a landscape viewed through the display 41) is displayed as a virtual image on the eyewear device 4. In addition, a line-of-sight of the worker wearing the eyewear device 4 is detected by the eye sensor 31, and a line-of-sight marker EM is displayed at a position corresponding to the line-of-sight on the display 41.

Figure 9:
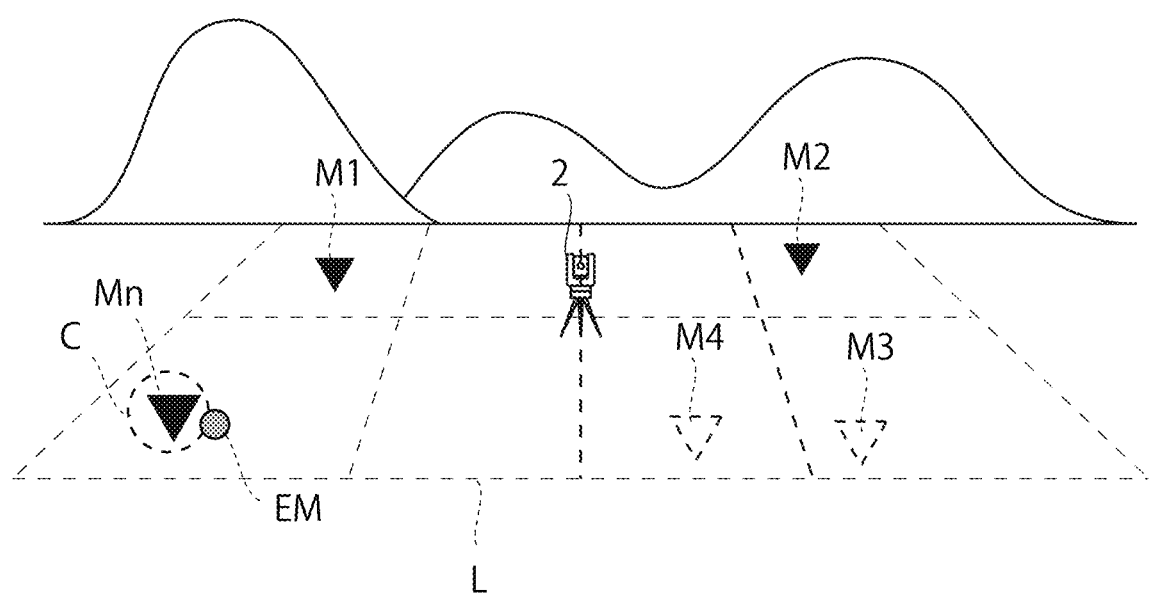
FIG. 9 illustrates an example of an image that a worker visually recognizes through the eyewear device.

FIG. 9 illustrates an example of display viewed through the display 41 by the worker wearing the eyewear device 4. The actual landscape is illustrated with solid lines, and the virtual image is illustrated with dashed lines. As illustrated in FIG. 9, the worker wearing the eyewear device 4 can confirm the measurement points Y superimposed on the actual landscape. That is, the measurement points Y (Y1, Y2, Y3 . . . ) are synchronized and displayed so as to be visually recognized as inverted triangular marks M (M1, M2, M3 . . . ) of virtual images at corresponding positions in accordance with the site. Lines L are displayed in a matrix at intervals of a predetermined distance from an arbitrary point (installation point of the surveying instrument 2 in FIG. 12). The inverted triangular marks M (M1, M2, M3 . . . ) are preferably recognizably displayed in such a manner that an unmeasured point and a measured point are distinguished by being colored in different colors, and the longer the distance from the worker (eyewear device 4) is, the smaller the displayed mark is.

Further, on the display 41, a line-of-sight marker EM is displayed at a position of the line-of-sight coordinates of the worker. In FIG. 9, the line-of-sight marker EM is indicated by a circle colored in sumi ink (gray in FIG. 9). In accordance with a line-of-sight movement of the worker, the line-of-sight marker EM also moves in real time.

Next, the processing shifts to Step S106, and a measurement point Yn (staking point) to be measured next is determined. From the inverted triangular marks M (M1, M2, M3 . . . ) displayed as measurement points Y (Y1, Y2, Y3 . . . ) on the display 41, the worker selects and determines one inverted triangular mark Mn as a next measurement point Yn. The worker aligns the line-of-sight marker EM with the inverted triangular mark Mn of the measurement point Yn to be measured next by looking at the inverted triangular mark Mn. When the line-of-sight marker EM overlaps the inverted triangular mark Mn, the inverted triangular mark Mn becomes a selected state and flashes, and when a predetermined period of time (about 3 seconds) elapses without turning of the line-of-sight, the inverted triangular mark Mn is determined as a next measurement point Yn. This inverted triangular mark Mn selected as a next measurement point Yn is displayed recognizably to the worker in such a manner that it is circled by a circle C, etc. In this step, the inverted triangular mark Mn also serves as the input unit 34 that can be selected, and is displayed as an option at a corresponding position on the display 41. The surveying instrument 2 directs the telescope 2c toward the determined measurement point Yn.

Figures 10A, 10B:
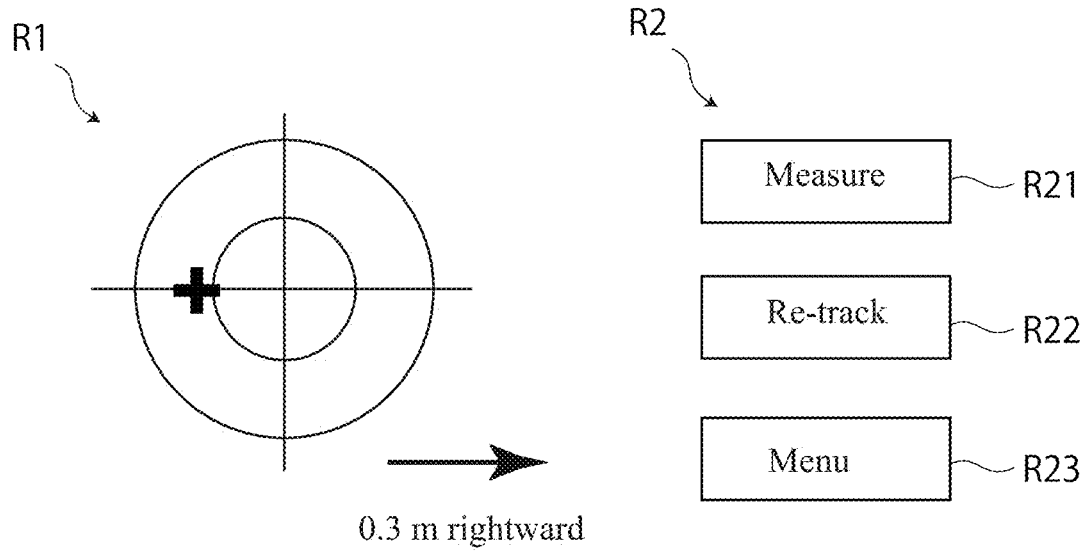
FIGS. 10A, 10B, and 10C illustrate examples of images that a worker visually recognizes through the eyewear device (during tracking).
Figure 10C:
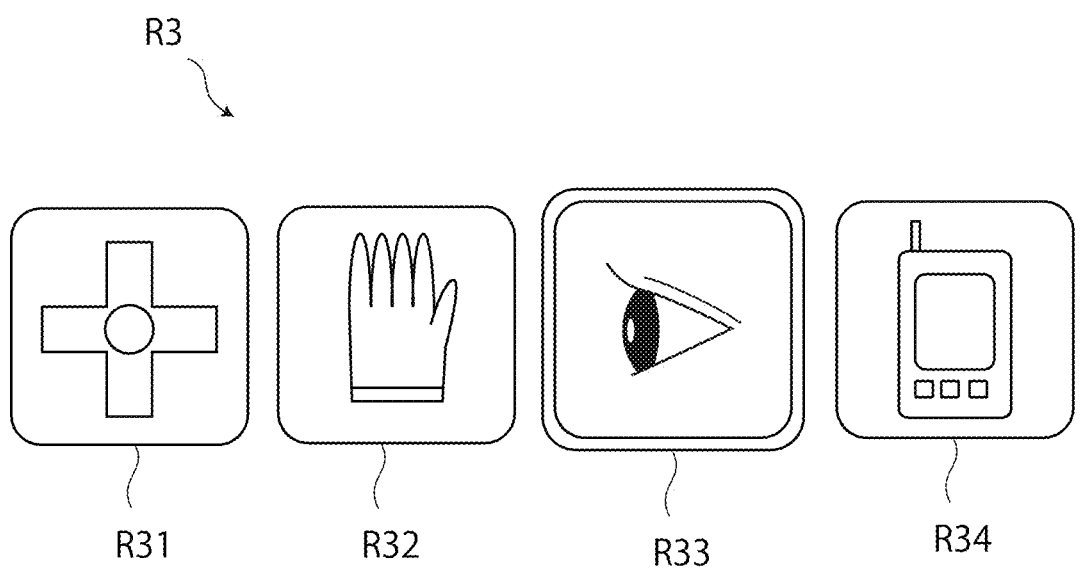

Next, the processing shifts to Step S107, and while gripping the pole 5, the worker moves to the measurement point Yn to be measured. When the target 7 approaches a predetermined range (approximately 1 m) from the measurement point Yn, the target 7 is locked on to by the surveying instrument 2, and the tracking unit 27 starts automatic tracking. FIG. 10A illustrates a virtual image added to the display 41 when the target 7 is locked on to. FIGS. 10A, 10B, and 10C illustrate images all of which are virtual images displayed on the display 41, and are illustrated with solid lines. As detailed position information of the target 7, details of a distance and a direction to the measurement point Yn are displayed as an image R1, and further, as the input unit 34, options that can be input are displayed as images R2 on the display 41.

During tracking, data is transmitted as needed, and a position of the target 7 is displayed in real time on the image R1. A command to the surveying instrument 2 is also possible, and commands that can be input are displayed as images according to the situation. FIG. 10B illustrates, as an example, images R2 of commands during tracking. By selecting an image R22 of "Re-track" in case lock on the target 7 is released, and an image R23 of "Menu" when making a transition to a menu screen by the line-of-sight marker EM, the respective commands are executed.

Images R3 illustrated in FIG. 10C are examples of menu content, and indicate control devices to be connected, and are displayed as icons on the display 41. For example, an image R31 indicates a small-sized control device to be attached to the pole 5. With this device, only inputs can be made, and because of the small size, a worker can input commands while gripping the pole 5. An image R32 indicates a glove-shaped control device. With this device, a command can be input into the surveying instrument according to motion of a hand from a sensor provided in the glove. An image R33 indicates the eyewear device 4, and commands can be input according to an eye motion. An image R34 indicates a control device configured as a separate body such as a smartphone or dedicated terminal. This device includes a display and a switch, and inputs can be made from the switch.

The survey system 1 can include one or more devices (control devices) capable of inputting commands, and can be simultaneously connected to a plurality of devices, and commands can be input from any one of the connected devices. In the present embodiment, the eyewear device 4 is connected as a control device of the surveying instrument 2, and the image R33 is highlighted to indicate the connection. By configuring the survey system 1 to allow the surveying instrument 2 to be connected to a plurality of control devices, a comfortable work environment can be established according to the skill level of the worker and compatibility with the device.

Next, the processing shifts to Step S108, and the worker grasps a detailed position based on the image R1 displayed on the display 41, and erects the pole 5 substantially vertically on the measurement point Yn. When the worker aligns the line-of-sight marker EM with the image R21 of "Measurement" by looking at the image R21 and continuously looks at the image for several seconds without changing his/her posture, a command to start measurements is transmitted to the surveying instrument 2, and the surveying instrument 2 starts distance and angle measurements, and measurement results are transmitted to the processing PC 6.

Next, when the measurements of the measurement point are completed in Step S109, measurement data are transmitted to the processing PC 6, and for selecting a measurement point Yn to be measured next, the processing shifts to Step S106, and Steps S106 to S109 are repeated until measurements of all measurement points Y are completed. After measurements of all measurement points Y are completed, the processing ends.

(Operation and Effect)

As described above, according to the survey system 1, measurement points Y (Y1, Y2, Y3 . . . ) are displayed on the eyewear device 4, and a worker can grasp the positions superimposed on an actual landscape. The worker can input a command from the eyewear device 4 by using his/her line-of-sight, so that the worker can input a command while gripping the pole 5 without moving. Wasteful action is omitted, and accordingly, a survey by a worker alone is improved in efficiency. Unlike the conventional case, the worker does not have to carry a device including a display and an input unit, turn his/her gaze to the display to perform a device operation, move a hand to make inputs, and support the pole with one hand. The worker can seamlessly perform a series of work for a survey alone, and the work efficiency is improved.

Images of the input unit 34 are preferably configured so that an image being selected by the line-of-sight marker EM is caused to flash, highlighted, or colored to enable visual recognition of the selection. A configuration which enables a worker to confirm an input in such a recognizable manner that a gauge indicates how many more seconds the worker should continue looking during selection, or a speaker is provided to produce sounds according to an operation, is more preferable.

Second Embodiment

Figure 11:
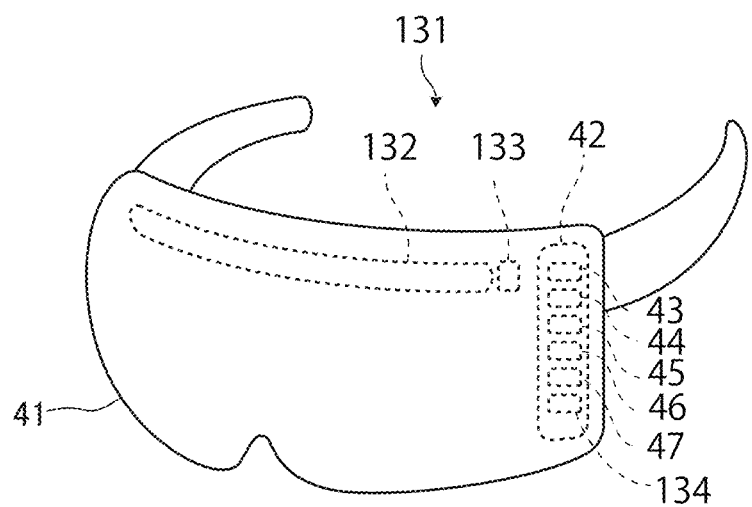
FIG. 11 is an external perspective view of an eyewear device according to a second embodiment.
Figure 12:
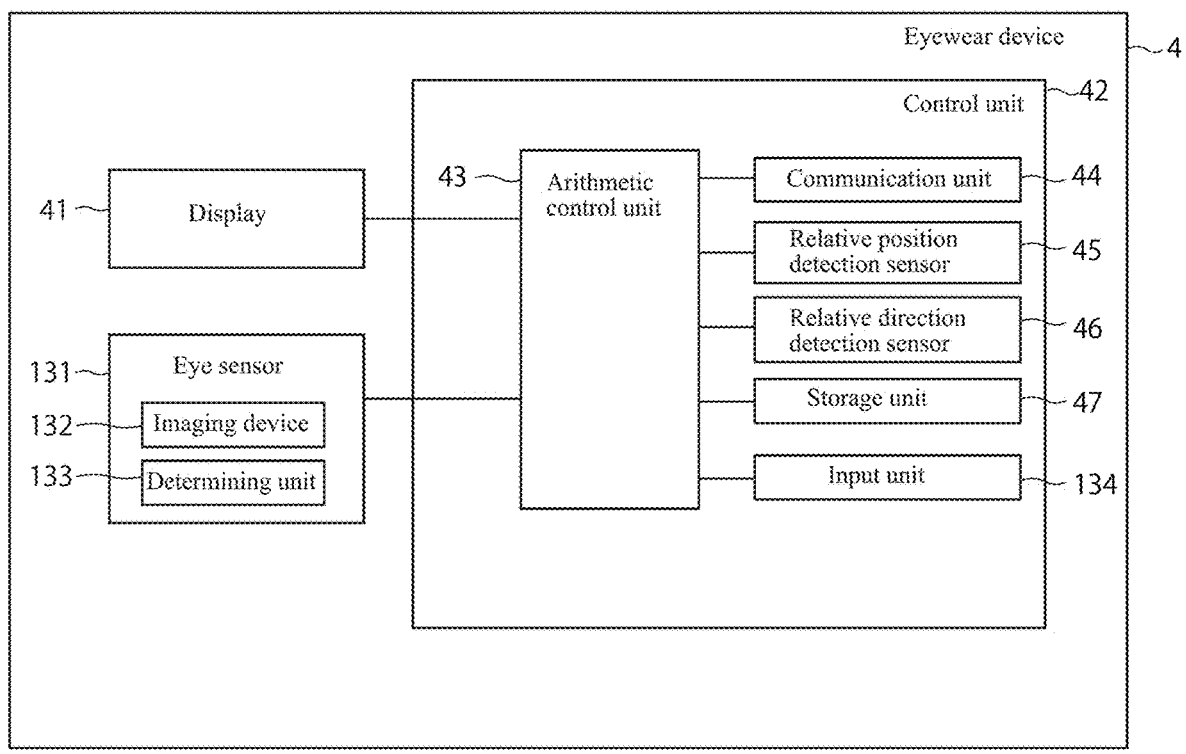
FIG. 12 is a configuration block diagram of the same eyewear device.

FIG. 11 is an external perspective view of an eyewear device 104 included in a survey system 101 according to a second embodiment. FIG. 12 is a configuration block diagram of the eyewear device 104. Components having the same configuration as the above-described are provided with the same reference signs, and description thereof will be omitted.

The survey system 101 has a configuration substantially equivalent to the configuration of the survey system 1, and includes the eyewear device 104. The eyewear device 104 also has a configuration substantially equivalent to the configuration of the eyewear device 4, and includes an input unit 134, and as an eye sensor 131, an imaging device 132 and a determining unit 133.

The imaging device 132 detects an eye motion of a wearer, and the determining unit 133 determines matching between the eye motion detected by the imaging device 132 and a plurality of motions (eye motion patterns) registered in advance. The input unit 134 inputs a command corresponding to a motion determined to be matching by the determining unit 133. In the present embodiment, without using the line-of-sight marker EM, various commands are directly input from eye motion patterns.

Eye motion patterns registered in advance and contents of commands are caused to correspond to each other, for example, "Selection (go next)" is input when a worker winks, "Cancellation (go back)" is input when the worker closes his/her both eyes for a predetermined period of time or longer, and "Determination" is input when the worker blinks slowly twice, etc. In response to a predetermined eye motion of a worker, this eye motion is detected by the eye sensor 131 and a command is input into the surveying instrument 2. Preferably, commands that can be input are displayed as images on the display 41, and a command (image) being selected is caused to flash or be highlighted. Producing sounds or light according to an operation so as to enable a determined and executed command to be recognized is more preferable. This eliminates the need to display a line-of-sight marker EM on the display 41, and the configuration becomes simpler. The worker can operate the surveying instrument 2 just by eye motions.

A preferred embodiment of the present invention has been described above, however, the embodiment described above is just an example of the present invention. For example, the arithmetic processing unit 65 and the storage unit 64 may be included in the surveying instrument 2. Accordingly, the functions of the processing PC 6 can be integrated with the surveying instrument 2, the settings can be easily made, and the surveying instrument 2 can be easily carried and moved. In this way, the embodiment can be modified based on the knowledge of a person skilled in the art.

Such modification and a combination of examples can be made based on the knowledge of a person skilled in the art, and such modification and combination are also included in the scope of the present invention.

REFERENCE SIGNS LIST

1: Survey system
2: Surveying instrument
4: Eyewear device
5: Pole
6: Processing PC
7: Target
19: Input unit
21: Horizontal angle detector
22: Vertical angle detector
23: Horizontal rotation driving unit
24: Vertical rotation driving unit
25: Arithmetic control unit
26: Distance-measuring unit
27: Tracking unit
28: Communication unit
29: Storage unit
31: Eye sensor
32: Determining unit
34: Input unit
41: Display
42: Control unit
43: Arithmetic control unit
44: Communication unit
45: Relative position detection sensor
46: Relative direction detection sensor
47: Storage unit
61: Communication unit
64: Storage unit
65: Arithmetic processing unit
132: Imaging device
133: Determining unit
134: Input unit
651: Synchronous-measuring unit
EM: Line-of-sight marker
Y: Measurement point

The invention claimed is:

1. A survey system comprising:
a target;
a pole to which the target is attached;
a surveying instrument including a distance-measuring unit configured to measure a distance to the target, an angle-measuring unit configured to measure a vertical angle and a horizontal angle at which the distance-measuring unit faces, a driving unit configured to drive a vertical angle and a horizontal angle of the distance-measuring unit to set angles, a communication unit, and an arithmetic control unit configured to execute input commands, and capable of making distance and angle measurements of the target;
an eyewear device including an eye sensor configured to detect an eye motion of a wearer, an input unit for inputting various commands, a communication unit, a display, a relative position detection sensor configured to detect a position of the device, and a relative direction detection sensor configured to detect a direction of the device;
a storage unit configured to store a measurement point at a survey site; and
an arithmetic processing unit including a synchronous-measuring unit configured to receive information on a position and a direction of the eyewear device and synchronize the information with coordinates of the measurement point, wherein
the display is a goggles-lens-shaped transmissive display that covers the eyes of the wearer,
on the display, the measurement point of the virtual image calculated by the arithmetic processing unit is displayed so as to be superimposed on a real image of a landscape of the survey site seen by the wearer, a command corresponding to an eye motion detected by the eye sensor is input by the input unit, and distance and angle measurements by the surveying instrument are made according to a command from the input unit.

2. The survey system according to claim 1, wherein the eye sensor is a line-of-sight sensor configured to detect a line-of-sight of a wearer, and on the display, a line-of-sight marker based on the line-of-sight sensor is displayed, and various commands are displayed on the display in the form of images as the input unit, and an image selected by the line-of-sight marker is input as a command.

3. The survey system according to claim 1, wherein the eye sensor includes an imaging device configured to detect an eye motion, and a determining unit configured to determine matching between an eye motion detected by the imaging device and a plurality of motions registered in advance, and the input unit inputs a command corresponding to a motion determined to be matching by the determining unit.

4. The survey system according to claim 1, wherein the surveying instrument includes a tracking unit configured to automatically track the target, and is configured so that the target is automatically tracked when the target is within a predetermined range from the measurement point, and position information of the target is displayed in real time on the display.

5. The survey system according to claim 1, wherein the storage unit and the arithmetic processing unit are included in the surveying instrument.

6. The survey system according to claim 1, wherein the display of the eyewear device generates all of the virtual image.

* * * * *